United States Patent
Cannata

(10) Patent No.: US 7,815,530 B2
(45) Date of Patent: Oct. 19, 2010

(54) GOLF BALL PROXIMITY TO HOLE MEASUREMENT

(76) Inventor: Joseph M Cannata, 646 Gloucester Dr., Highland Hts., OH (US) 44143

( * ) Notice: Subject to any disclaimer, the term of this patent is extended or adjusted under 35 U.S.C. 154(b) by 0 days.

(21) Appl. No.: 12/142,777

(22) Filed: Jun. 20, 2008

(65) Prior Publication Data

US 2009/0318247 A1  Dec. 24, 2009

(51) Int. Cl.
*A63B 57/00* (2006.01)
(52) U.S. Cl. .................. 473/407; 473/409
(58) Field of Classification Search .......... 473/407, 473/176; 33/759, 760, 770; 24/460–462; 248/113

See application file for complete search history.

(56) References Cited

U.S. PATENT DOCUMENTS

| | | | | |
|---|---|---|---|---|
| 1,684,566 A | * | 9/1928 | Winkler | 33/759 |
| 1,711,730 A | * | 5/1929 | Gibson | 248/113 |
| 1,978,033 A | * | 10/1934 | Suppes | 248/312 |
| 2,041,119 A | * | 5/1936 | Duganne | 473/176 |
| 3,105,303 A | * | 10/1963 | Frizzell | 33/294 |
| 3,286,963 A | * | 11/1966 | Bergman | 248/74.2 |
| 3,313,009 A | * | 4/1967 | Beckerer | 248/74.2 |
| 3,604,711 A | * | 9/1971 | Hansburg | 473/257 |
| 3,834,030 A | | 9/1974 | Hanson | |
| 4,273,329 A | * | 6/1981 | Trigg et al. | 473/407 |
| 4,532,712 A | * | 8/1985 | Vistain | 33/613 |
| 4,665,620 A | * | 5/1987 | Osteen | 33/760 |
| 4,880,232 A | * | 11/1989 | Lang | 473/176 |
| D305,306 S | | 1/1990 | Casiello | |
| 4,960,278 A | | 10/1990 | Hainey | |
| 5,040,307 A | | 8/1991 | Dotson | |
| 5,052,687 A | | 10/1991 | Katerba | |
| 5,442,866 A | * | 8/1995 | Woods | 33/760 |

(Continued)

OTHER PUBLICATIONS

Cannata, "Pin Shot Winner", Pin_shot_winner4.pdf (Acrobat pdf file), Jun. 19, 2009, 1 page, Whoz-Away, USA . . . This is an example of a commercially successful product resulting from the invention disclosed in the present application. The illustrated graphics are the "record sheet 48" that is to be used with the inventive "clamping proximity marker sign 51". The patent pending label illustrated on the sheet refers to the inventive apparatus and method as claimed.

(Continued)

*Primary Examiner*—Steven Wong
(74) *Attorney, Agent, or Firm*—D. A. Stauffer, Reg. Patent Agent

(57) ABSTRACT

Apparatus for accurately measuring the distance between a golf ball and the hole on a putting green, i.e., for determining proximity, especially in golf competitions to see who can hit their ball onto the green to end up in closest proximity to the hole. An accessory to the measurement device is a proximity sign for recording the proximity measurements. The invention comprises apparatus and method for conveniently storing and using the measurement device(s). For proximity measurements, the device is configured to removably and repositionably attach a tape measure to a flag pin (generally the flag pin in the hole on the green in contest). The proximity sign is similarly configured. For storage of a device when not in use, the devices include spring clips and an optional security ring to impede unauthorized removal from the flag pin.

3 Claims, 2 Drawing Sheets

U.S. PATENT DOCUMENTS

| | | |
|---|---|---|
| D377,611 S | 1/1997 | Miklas |
| D397,626 S | 9/1998 | Davis |
| D447,709 S | 9/2001 | Brandt |
| D450,001 S | 11/2001 | Pluvinage |
| 6,405,442 B1 | 6/2002 | Ratcliff |
| D511,467 S | 11/2005 | Sanoner |
| 7,075,438 B2 | 7/2006 | Kent et al. |
| D526,228 S | 8/2006 | Markin |
| 7,131,214 B1 * | 11/2006 | Blackman et al. ............. 33/761 |
| 7,377,050 B2 * | 5/2008 | Shute et al. ................... 33/761 |
| 7,407,140 B2 * | 8/2008 | Sen ............................ 248/121 |
| 7,422,188 B1 * | 9/2008 | Schlosser .................... 248/535 |
| 2006/0148595 A1 * | 7/2006 | Bostock ...................... 473/407 |

OTHER PUBLICATIONS

Cannata, "Whoz-Away", Whozaway_Flyer_red.pdf (Acrobat pdf file), Jul. 2, 2009, 2 pages, Whoz-Away, USA . . . This is an example of a marketing flyer being used for the commercially successful products resulting from the invention disclosed in the present application, including both the claimed method and the claimed "tape clamp device 100", preferably used with the claimed "clamping proximity marker sign 51".

* cited by examiner

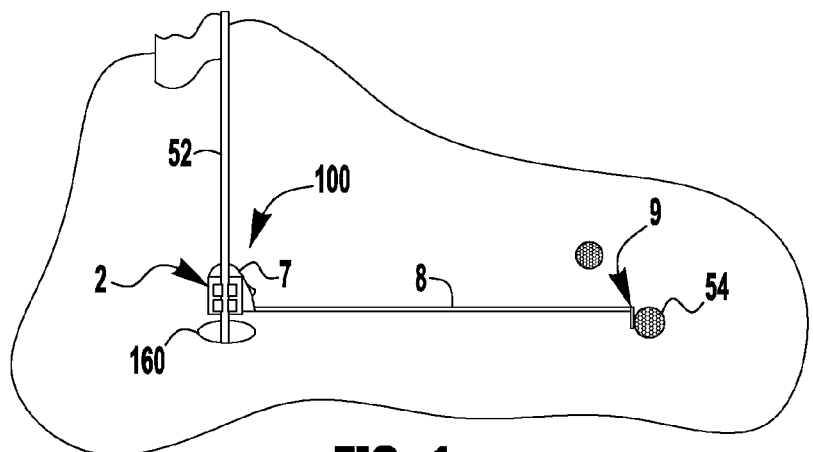
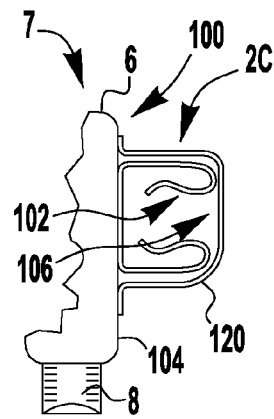
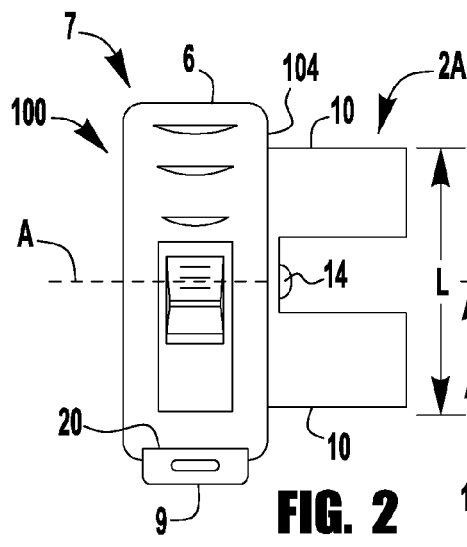
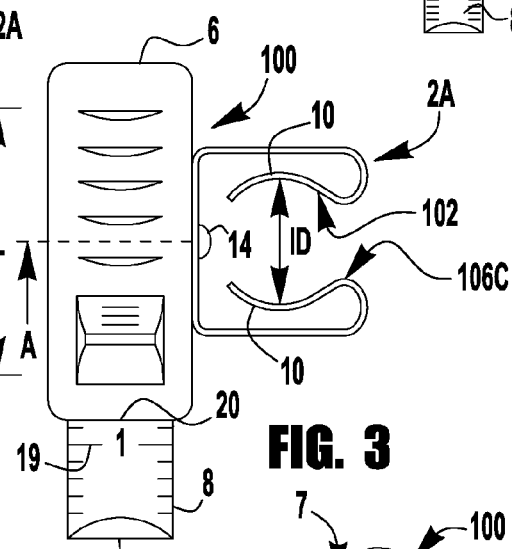
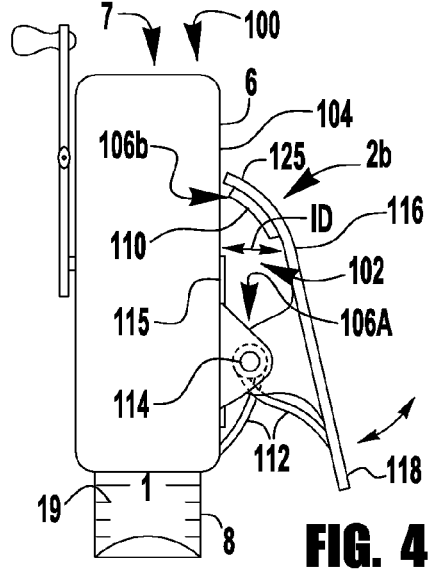
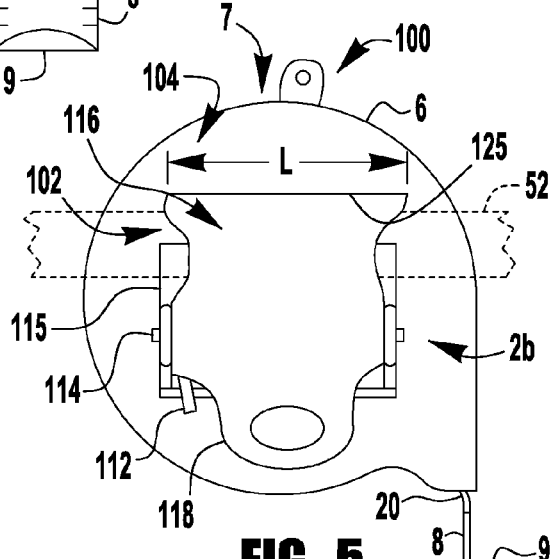
FIG. 1
FIG. 2
FIG. 3
FIG. 4
FIG. 5
FIG. 6

GOLF BALL PROXIMITY TO HOLE MEASUREMENT

TECHNICAL FIELD OF THE INVENTION

The present invention relates to apparatus ancillary to equipment used to play golf and, more particularly apparatus for measuring distance of a golf ball from the hole on a putting green.

BACKGROUND OF THE INVENTION

During the play of the game of golf it is often desirable to determine, while on the putting green and ready to putt, who is "away", i.e., whose ball is furthest from the hole, because that determines the first person required to putt. As is often the case, individual players may be close enough in distance from the hole in different directions around the hole, that it is difficult to ascertain who is away. This is typically resolved by either pacing the distance from the hole to each ball on the green, or alternatively, by using a crude measuring device such as the golf hole flag stick (pin), golf clubs, or the like. Such methods of measuring are either inaccurate, or cumbersome, or both.

The issue of distance from the hole becomes even more critical when players are involved in a contest to determine whose ball stops moving in closest proximity to the hole when hit onto the green. In such a contest, even fractions of an inch can determine a winner among many different players of the contested hole. Side bets may be involved, and the situation is ripe for cheating and arguments, if not physical fights, especially if a means for accurate and consistent distance measurement isn't available. Therefore an accurate measurement device, particularly one having a built-in enforcement of consistent measurement method is needed. For example, the measurement can be made from the edge of the cup in the hole, the center of the hole, or the side of the pin (flag stick) in the cup; to the side or the center of the ball. Furthermore, the "side" of the hole or ball could be the nearest or the farthest side. Consistent choices for all of these factors must be made by every player on the subject green. Even given consistent choices, accuracy of measurement will also be affected by how accurately the measurer estimates the location of "nearest/farthest side" or "center", possibly having to take into account parallax.

Often in such "closest to the pin" contests, an actual measurement number is not used, but rather a "proximity marker" is used to physically indicate where the previously closest ball was located. The marker is typically a pointed spike (ground stake) supporting a small sign board upon which player's names are placed in sequence as each following name applies to a closer proximity than the preceding ones. The closest proximity so far is marked by pressing the stake into the ground, and the bottom name indicates the achiever of that closest position.

The described type of proximity marker causes greens maintenance issues wherein holes left by the ground stake of a typical proximity marker are damaging to the bent grass on the green. The round hole perhaps a half inch in diameter that is left by a proximity marker stake is too big to close easily and thus leaves a spot for foreign grass seed to access the underlying dirt, plant itself and grow where it is not wanted. Therefore there is a need for means to record relative proximity without placing holes in the green. Of course a proximity marker stuck anywhere in the ground can be a nuisance as an obstacle that can be unfairly moved between players.

U.S. Pat. No. 3,834,030 (Hanson; Sep. 10, 1974) discloses a closest to pin measurer that provides a post for fitting in the flag pin hole of the cup and an attachment point for the free end of a tape measure. Although this helps provide a consistent measurement point at the cup, it appears to be a nuisance to use and to store when not in use, since it must be put into the cup in place of the flag pin for use, then taken out and stored somewhere when the flag is replaced.

U.S. Pat. No. 4,880,232 (Lang; Nov. 14, 1989) discloses a distance measuring device wherein a T-handled stake fits into the flag pin hole of the cup (in place of the flag pin) and a tape measure that is stored in a U-shaped holder on the stake can be pulled away from the stake to make a measurement. The free end of the tape is secured to the stake. A card holder is also attached to the stake to replace a movable position-indicating proximity marker. This device apparently suffers from essentially the same limitations as Hanson regarding nuisance.

Both Hanson and Lang join many other prior art measurement devices in using a measurement method of holding the free end of a tape or string at the hole, and pulling the tape measure body out to the ball. A problem with this method is that the body is bulky and often awkward to position accurately against the ball without moving it; and if the body is pulled past the ball, then a reading on the tape measure must be made by lining up the horizontal tape with a consistent point of the round ball while avoiding parallax errors—something that very few people can do well.

U.S. Pat. No. 4,273,329 (Trigg et al.; Jun. 16, 1981) reverses the measurement in the embodiment of his FIGS. 2-3 by clipping the body on the flag pin and pulling the free end of a string out to the ball. This also avoids the nuisance of having an extra device lying around the green since it clips onto the existing flag pin. However, Trigg et al.'s device is apparently designed for being carried by an individual golfer, not for leaving at a hole. Thus it has a string for relative, but not measureable, distance determination; and the body of the device is held in a horizontal plane when clipped on the flag pin, making it difficult to read if a tape measure were to be substituted since the tape would be vertical. Thus it has a belt clip but not a substantial clip for secure or permanent attachment to the flag pin. Trigg's flag pin clip comprises a reel housing (14) onto which are rotatably attached a left clip half (42) and a right clip half (46). The right clip half (42) has an arcuate portion and the left clip half (46) has an arcuate portion, the ends of which engage each other at a meeting point (50). A spring (54) biases the right and left clip halves (42, 46) into engagement at point (50).

Since Trigg et al.'s device is intended for personal carrying such as on a belt, his clip must be relatively thin and appears to be wire-formed and somewhat "flimsy". It appears that if the spring is not strong enough then the device would be easily pulled off the flag pin during use, especially since the stress is applied primarily at the meeting point of the two clip halves. On the other hand, making the spring stronger could easily cause problems wherein if the wire is bent somewhat to result in mis-alignment of the clip halves at the meeting point, then the halves would not meet but would bypass each other. Therefore Trigg et al.'s device would not appear to be suitable for contest use: it is not rugged enough for many players to use/abuse; and it won't stay up off the ground if left clipped onto the flag pin.

Therefore it is an object of the present invention to provide apparatus and method of use for accurately and consistently measuring proximity to the hole for a plurality of golf players. Its an added object to be able to make such measurements and record them for many players as each plays through a given hole where the device would be stored for use by all.

BRIEF SUMMARY OF THE INVENTION

Invention concerns apparatus for accurately measuring the distance from a golf ball to the hole on a putting green, i.e., for determining proximity, especially in golf competitions to see who can hit their ball onto the green to end up in closest proximity to the hole.

An accessory to the measurement device is a proximity marker for recording the proximity measurements.

The invention comprises apparatus and method for conveniently storing and using the measurement device(s).

For proximity measurements, the device is configured to removably and repositionably attach a tape measure to a flag pin (generally the flag pin in the hole on the green in contest). The proximity marker is similarly configured.

For storage of the device when not in use, the devices include spring clips and optional security ring to impede unauthorized removal from flag pin. These storage components allow the devices to either be kept at a single green or to be kept by a player while advancing from hole to hole. The spring clips will clamp the devices onto poles and posts, including, for example, the flag pin and a proximity marker (optionally a post on a golf cart).

Two exemplary versions of a spring clip are disclosed: A U-shaped strip of spring metal, and a hinged, spring-biased clamp.

The devices additionally address greens maintenance issues wherein holes left by the ground stake of a typical proximity marker are damaging to the bent grass on the green. The round hole perhaps a half inch in diameter that is left by a proximity marker is too big to close easily and thus leaves a spot for foreign grass seed to access the underlying dirt, plant itself and grow where it is not wanted. When using either inventive device the proximity marker can be staked in a fixed location near to but not on the green, and can still be used for holding written records of measured proximity for players. Alternatively, the proximity marker can be clipped onto the flag pin, thereby eliminating the need for any kind of post stuck into the ground.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199a, 199b, 199c, etc. Such relationships, if any, between similar elements in the same or different figures will become apparent throughout the specification, including, if applicable, in the claims and abstract.

The structure, operation, and advantages of the present preferred embodiment of the invention will become further apparent upon consideration of the following description taken in conjunction with the accompanying drawings, wherein:

FIG. 1 is a perspective view of a tape measure clamped onto a flag pin and being used to measure proximity of a golf ball to the hole, according to the invention.

FIG. 2 is a side view of a tape measure with a clip attached to it, according to the invention.

FIG. 3 is a top view of the tape measure and clip of FIG. 2, according to the invention.

FIG. 4 is a top view of a tape measure with a second embodiment of a clip attached to it, according to the invention.

FIG. 5 is a plan view of the tape measure and clip of FIG. 4, according to the invention.

FIG. 6 is a partial top view of the tape measure and clip of FIG. 3, with a security ring added, according to the invention.

Figure 7:
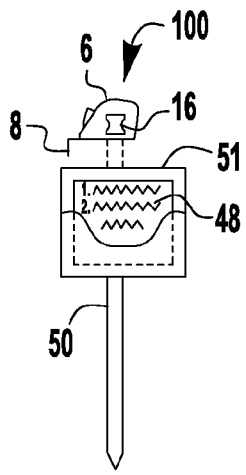

FIG. 7 is a front view of a proximity sign and a tape measure being clipped onto it, according to the invention.

Figure 8:
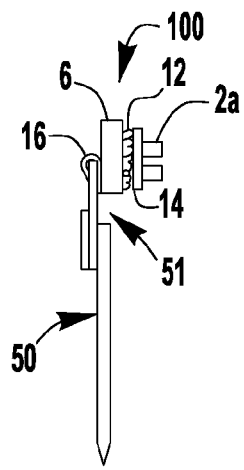

FIG. 8 is a side view of a proximity sign and a tape measure that is clipped onto it, according to the invention.

Figure 9:
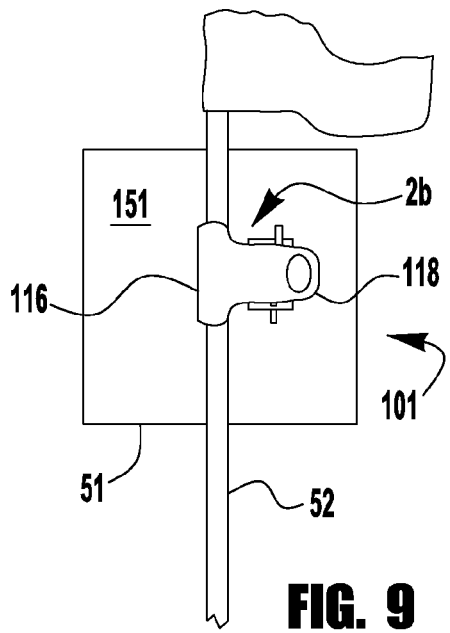

FIG. 9 is a plan view of the back of a proximity sign with an attached clip being used to clamp the sign onto a flag pin, according to the invention.

Figure 10:
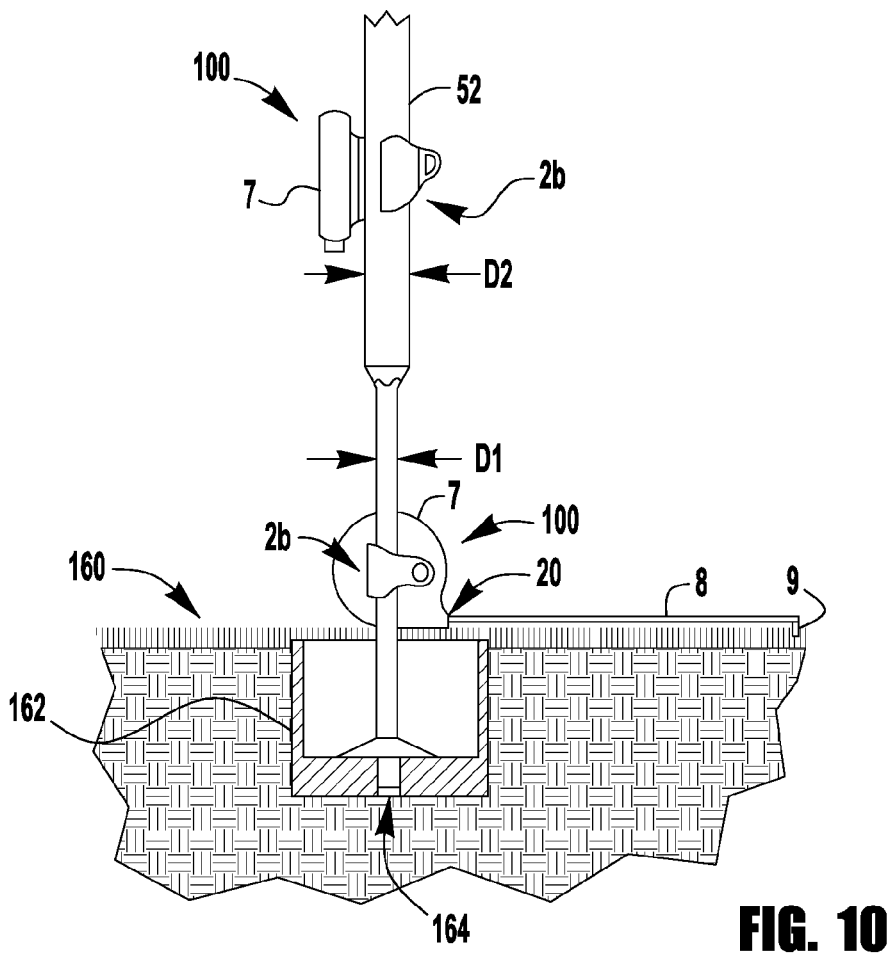

FIG. 10 is an elevational view of a two-diameter flag pin in a cup shown in cross section, with a tape clamp device shown clamped onto the pin in a position for measurement use and in a higher position for storage out of the way, all according to the invention.

DETAILED DESCRIPTION OF THE INVENTION

FIGS. 1-8 show various views of an inventive measuring tape clamp device 100 with three exemplary embodiments of a spring clip 2 (individually referenced as clips 2a, 2b, and 2c). FIG. 1 shows the device 100 in use for measuring proximity of a golf ball 54 to a flag pin 52 in a hole 160 on a green. FIG. 10 shows details of the pin 52 as it is typically held in an axial hole 164 at the bottom of a cylindrical cup 162 that defines the hole 160.

The tape clamp device 100 uses a conventional reel type of tape measure 7 comprising a flexible measuring tape 8 spooled around a rotational axis "A" in a housing 6 such that a free end 9 of the tape 8 extends out of the housing 6 tangential to the axis A, and the housing 6 has at least one side 104 that is at least partially normal to the axis A. The reel may have a coil spring driven rewind with a thumb slide lock as illustrated in FIGS. 2-3. The reel may have a folding crank arm to rewind the tape 8 as shown in FIG. 4. Many variations are possible of course, the only requirement being that the measuring tape 8 can be extended outward and retracted, and has measurement indices 19 on it (e.g., inches and fractions thereof). This allows for numeric distance measurements. For large greens, a fifty foot measuring tape 8 may be required.

A clip 2 is mounted (e.g., riveted 14) on the housing side 104. Other types of mounting attachment are within the scope of the invention, such as, for example, adhesive, or releasable mounting like hook and loop fastener 12 (shown in FIG. 8).

Referring to FIGS. 2 and 3, a first embodiment of the tape clamp device 100 is shown wherein a U-shaped springy metal clip 2a is utilized. The clip 2a is seen to be in the form of springy sheet metal (although other materials can be used as known) bent into a roughly U shape wherein two opposing fingers 10 are biased together by the metal's springiness to clamp the device 100 onto poles and posts, including, especially, the flag pin 52. The clip 2a has an aperture 102 therethrough with an inside dimension "ID" and a longitudinal dimension "L" that is substantially perpendicular to the axis A of the tape measure 7. Even though the illustrated clip 2a has two sets of spring fingers 10, their apertures 102 are aligned to effectively create an overall aperture length (longitudinal dimension) L. In order to springingly clamp onto the flag pin 52, the aperture's inside dimension ID is at least slightly less than the flag pin's ground level diameter D1 (see FIGS. 1 and 10), and the aperture's longitudinal dimension L is greater than the flag pin's ground level diameter D1, preferably significantly greater, such as by a factor of two or more. The ratio prevents turning of the tape measure 7 about its axis A as the tape 8 is pulled out, and also helps securely gripping the pin 52.

Referring now to FIGS. 4 and 5, a hinged type of clip 2b is shown. This second embodiment of the clip 2 is like those used on clipboards wherein the two opposed fingers are rigid but joined by a hinge pin 114. A coiled torsion spring 112 provides the spring bias about the hinge pin 114 that drives the clamping action for this hinged clip 2b embodiment. One side (finger) 115 is attached to the tape measure 7. The other comprises a moving or clamping finger 116 and preferably a lever arm 118 on the other side of the hinge pin 114 to make clamping and unclamping easier. Of course other types of springs and variations of finger shape are well known for spring clips or clamps, and all functional equivalents are therefore within the scope of this invention.

As best seen in FIGS. 3 and 5, the tape 8 exits the housing 6 through an opening 20 that is oriented suitably for convenient and accurate reading of whichever index mark on the tape 8 lines up with the opening 20, which therefore can also be called the "measure-to" point 20. As illustrated in FIGS. 1, 5 and 10, the spring clip 2 must be mounted on the housing side 104 such that the longitudinal dimension L of the aperture 102 is perpendicular to the tangentially extending tape 8 at the point where it exits the housing 6 through the opening 20 (since the opening 20 determines which tangential direction is followed relative to the housing 6). This assures that the tape 8 will extend outward parallel to the ground when the clip 2 is clamped on a flag pin 52.

Important features of the hinged embodiment of clip 2b are: a finger 116 size that allows opening far enough to clamp/clip onto a suitable range of rod or post diameters; and a curled outer end 125 of the clamp finger 116 that creates an appropriate minimum aperture dimension ID but still is able to hook around a post when opened as wide as needed. A suitable range is enough to accommodate flag pins 52 in all available diameters (e.g., ½ and ¾ inch), noting that some flag pins 52 have a smaller ground level diameter D1 (e.g., ½") near the ground but taper out to a larger diameter D2 (e.g., ¾") higher up as shown in FIG. 10. Thus the clip 2 on a tape clamp device 100 used as shown in FIG. 10 must be able to clamp on the smaller diameter D1 part of the pin 52 when making a measurement, then must be able to clamp on the larger diameter D2 part of the pin 52 for storage between measurements so that the tape clamp device 100 is out of the way during play. Furthermore, if a post on a golf cart is to be gripped by the same tape clamp device 100 that must clip on the flag pin 52, then the hinged type of clip 2b would probably be better than the springy metal clip 2a described previously, since the hinged style can be easily designed to clip on a much wider range of rod diameters.

Another advantage of the hinged embodiment of the spring clip 2b is that it will clip onto a flat surface as well as onto a rod, therefore the tape clamp device 100 can use the hinged embodiment of the spring clip 2b for clamping it onto the proximity marker sign board 51, without the need for an optional belt clip 16 as used in FIGS. 7-8. Also, the hinged clip 2b could be used to clamp the tape clamp device 100 onto the ground-engaging post (ground stake) 50 of the proximity marker sign 51, even though the stake 50 is apt to have a smaller diameter.

FIG. 9 shows an inventive clamping proximity sign 101. Instead of a permanently affixed ground stake 50 (see FIG. 8), the sign 51 has a clip 2 (preferably a hinged clip 2b) attached to a back side 151 of the proximity sign 51. This enables the flat sign part 51 of the proximity marker to be clamped on any rod, not just its normal ground stake 50. Preferably the clamping proximity sign 101 is clamped on the flag pin 52, thereby eliminating holes in the green from the ground stake 50, and also thereby positioning the sign 51 up out of the way of play.

Additional features of the second, preferred embodiment of the spring clip 2, i.e., the "hinged spring clip" 2b, include any obvious variations of the following functional elements. The curled outer end 125 of the clamp finger 116 can be more or less curled to adapt a given overall size of hinged spring clip to a suitable range of rod diameters. For example, a clamp finger end 125 may be more curled for use on the proximity sign 51 in order to clamp it onto a ground stake 50 which is a relatively small diameter rod. On the other hand, the hinged spring clip 2b on the proximity sign 51 of FIG. 9 has less of a curl because it is intended for use to clamp onto rods with a wider range of rod diameters, such as from 0.50 inch to 0.75 inch for flag pins 52. Of course, a bigger overall size for the hinged spring clip 2b will also allow clamping onto bigger rods. Obviously this discussion concerning a hinged spring clip 2b on the clamping proximity sign 101 equally applies to a tape clamp device 100 with a hinged spring clip 2b as shown in FIGS. 4-5. In FIG. 5 a partial length of a flag pin 52 is shown in dashed outline where it would be clamped in the clip 2b.

The hinged embodiment of the spring clip 2b as shown can easily have much wider fingers 116 (longitudinal dimension L) for gripping a longer portion of a rod, thereby improving the grip to help prevent sliding down the rod 52 and/or falling off. For further gripping improvement, a resilient pad or other type of high friction surface 110 can be attached inside the aperture 102, e.g., to the underside of the clamping finger 116 as shown in FIG. 4.

The spring finger 10 style of clip 2a has its aperture 102 longitudinally split in one place 106c, while the hinged type of clip 2b has a longitudinal split in two places 106a, 106b. In other words, the apertures 102 of these two embodiments of clip 2 have a longitudinal opening that allows them to be laterally moved onto or off of a longitudinally extending rod (e.g., 50, 52) or planar edge (e.g., edge of proximity sign 51). Although such an arrangement is convenient, it also makes it easy for a miscreant to steal the tape clamp device 100 from the flag pin 52. FIG. 6 shows another embodiment of clip 2, a secure clip 2c, that has an additional security ring 120 affixed across the longitudinal split 106 of the clip 2 (e.g., clip 2a). This closes the open portion of the aperture 102 to inhibit unauthorized removal from the flag pin 52. Of course it could still be slid off the top end of the flag pin 52, but a larger diameter ring or flange on the pin 52 under the flag could prevent that. It can be seen that an equivalent form of secure clip 2c would be a closed aperture 102 with fingers 10, 115, 116 that are spring biased toward reducing the inside dimension ID.

FIG. 7 shows an exemplary embodiment of a proximity marker sign 51 with a record sheet 48 held therein. Using the inventive tape clamp device 100 to accurately measure and produce numeric proximity distances enables an improved method for determining the winner in a closest-to-the-pin contest. Instead of pushing a proximity marker stake 50 into the ground of the green wherever the closest ball landed, now the proximity sign 51 can be kept in one place not on the green, and the numeric proximity distance as measured by the tape clamp device 100 can be simply handwritten on the record sheet 48 held by the proximity sign 51. Each player in turn measures his proximity distance and compares it with the lowest number on the sign 51. If the player determines that his proximity distance is lower than the previous low, he can write the new lowest number on the sign 51 along with his name. By also using the inventive clamping proximity sign 101, the sign 51 is clamped onto the flag pin 52 above the tape clamp device 100, thereby removing an obstacle from the ground.

Referring to FIGS. 1 and 10, an inventive method of proximity measurement utilizes the tape clamp device 100 in the following steps:

1. Leaving the flag pin 52 in the hole 160, slide, or otherwise reposition and clamp the clip 2 of the device 100 on the flag pin 52 such that the measuring tape 8 is approximately at ground level.

2. Rotate the device 100 and/or the flag pin 52 so that the tape 8 extends in the direction of the ball 54 that is to be measured.

3. Pull the tape 8 out of the tape measure 7 toward the ball 54 and stop when the tape end 9 touches the nearest point on the surface of the ball 54.

4. Observe the proximity distance indicated by the indices 19 where they align with the measure-to point 20 of the tape measure 7 (e.g., where the tape 8 passes into the housing 6). This reading can be used even though it doesn't go to the center of the hole 160, because it will be off by a fixed amount that is equal for all players. If desired, the fixed distance can be added to the reading, or the indices 19 can be pre-adjusted to compensate.

5. Record the observed proximity measurement numeric value on the proximity sign 51 if it is a new low value. —OR— compare measurements with those for other balls 54 presently on the green to accurately determine "who's away".

6. For measuring proximity of a plurality of balls 54 that are simultaneously on the green, the tape 8 is left pulled out, and the pin 52 is rotated until the tape 8 extends toward the next ball 54 to be measured.

7. Rewind the tape 8 into the tape measure 7.

8. Slide, or otherwise reposition and clamp the clip 2 on the flag pin 52 at an elevation sufficient to avoid interference with game play, thus storing the tape clamp device 100 until it is needed again.

Preferably the inventive clamping proximity sign 101 is also employed in the above method, the clip 2 attached to the sign 51 being clamped onto the flag pin 52 above the tape clamp device 100.

Given the teaching of the present disclosure, a designer of ordinary skill should be able to make the inventive devices 100, 101 and the clips 2 (2a, 2b, 2c) out of a variety of materials (plastic, metal, etc.), and with a variety of appearances, shapes and combinations of the features discussed herein, as long as the various design changes do not impair the functionality described herein. All such variations are within the scope of the present invention.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention as claimed are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method of determining closest proximity to a golf green hole for a plurality of golf balls played by a corresponding plurality of players; said proximity being a distance between said hole on said green and a golf ball, said hole being defined by a conventional internal cup with a central axial hole at its bottom, the axial hole removably holding a conventional round flag pin with a first diameter where it extends up above a top, ground level edge of the hole; the method comprising the steps of:

(a) providing a tape clamp device that comprises a tape measure with a flexible measuring tape that has measurement indices on it, spooled on a rotational axis in a housing such that a free end of the measuring tape extends out of the housing tangential to the rotational axis, and further comprising a hinged spring clamp that is affixed on a side of the housing, the spring clamp comprising a clamping finger extending from a hinge pin to a curled outer end that is spring biased toward clamping the outer end against the side of the housing to form an aperture therebetween that has an inside dimension which increases from a minimum to a maximum magnitude as the clamping finger is opened against the spring bias, and wherein the clamping finger and curled outer end are configured to releasably clamp on the flag pin where its diameter is the first diameter, while orienting the measuring tape for extension out of the housing parallel to ground level;

(b) using the spring clamp to clamp the tape measure onto the flag pin;

(c) leaving the flag pin in the hole as for conventional methods of golf play;

(d) sliding, or otherwise positioning and clamping the tape clamp device on the flag pin such that the measuring tape is approximately at ground level;

(e) rotating the tape clamp device about a longitudinal axis of the flag pin so that the measuring tape extends in the direction of a one of the plurality of golf balls that are present on the golf green;

(f) extending the measuring tape out of the tape measure, along the ground toward the one golf ball, and stopping when the measuring tape's free end touches the one golf ball at a point that is nearest to the flag pin;

(g) observing the proximity distance indicated by the measuring tape indices;

(h) repeating steps (e), (f) and (g) for each additional one of the plurality of golf balls that are simultaneously present on the golf green;

(i) retracting the measuring tape into the tape measure;

(j) recording the smallest proximity distance observed this far in game play along with the name of the corresponding one of the plurality of players; and (k) for storing the tape clamp device until it is needed for subsequent proximity determinations, sliding, or otherwise positioning and clamping the tape clamp device up on the flag pin at a raised elevation above ground level that is sufficient to avoid interference with game play.

2. The method according to claim 1, wherein:
the flag pin has a second diameter, greater than the first diameter, at said raised elevation; and the clamping finger and curled outer end of the provided tape clamp device are configured to also releasably clamp on the flag pin where its diameter is the second diameter.

3. The method according to claim 1, further comprising the steps of:

providing a proximity sign that comprises a writing surface on a planar front side and a sign spring clamp affixed on an opposed back side, wherein the sign spring clamp is like the hinged spring clamp of the tape clamp device;

using the sign spring clamp to clamp the proximity sign onto the flag pin above the tape clamp device, thereby removing an obstacle from the ground; and using the writing surface for the step (j) of recording the smallest proximity distance.

* * * * *